Sept. 29, 1964 R. S. STRIMEL 3,150,526
LINEAR RESPONSE MEASURING INSTRUMENT
Filed Nov. 4, 1959
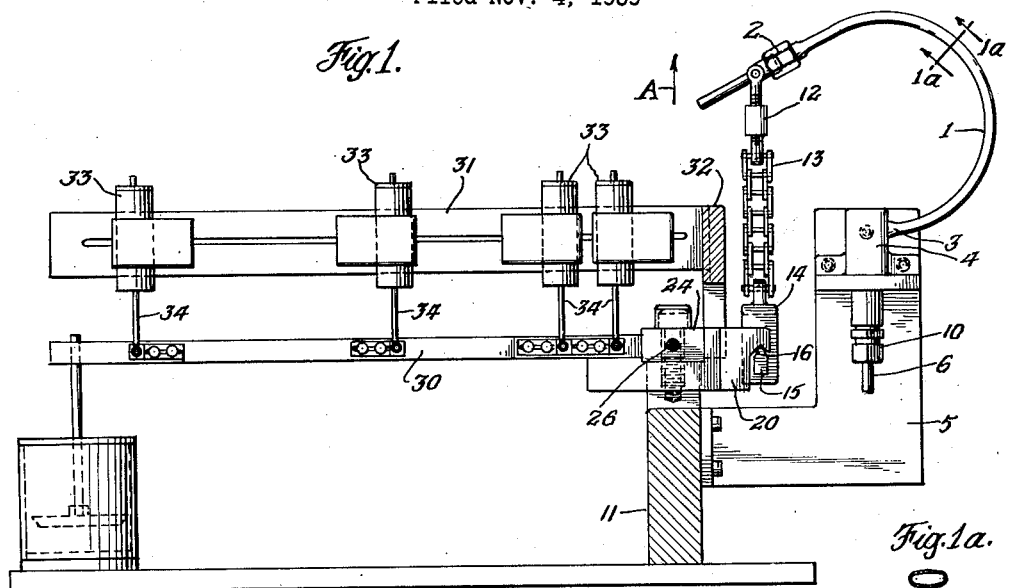
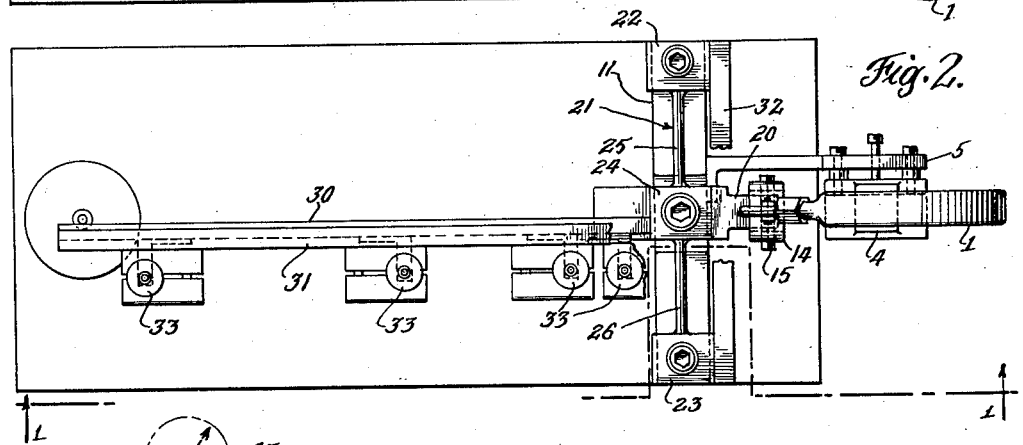
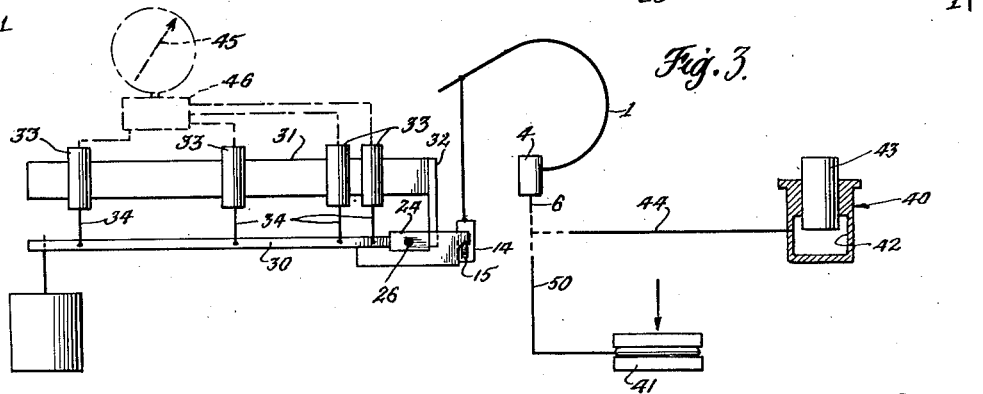
INVENTOR
Robert S. Strimel
Synnestvedt & Lechner
ATTORNEYS

3,150,526
LINEAR RESPONSE MEASURING INSTRUMENT
Robert S. Strimel, Penllyn, Pa., assignor to Tinius Olsen
  Testing Machine Company, Willow Grove, Pa., a corporation of Pennsylvania
Filed Nov. 4, 1959, Ser. No. 850,805
3 Claims. (Cl. 73—411)

This invention relates to measuring instruments of the type wherein fluid pressure is the actuating means and in particular the invention relates to such a measuring instrument which is constructed to provide accurate and linear response at very high fluid pressures.

The term "fluid" as used herein will be understood to mean either a gas or a liquid and the term "measuring" will be understood to encompass the sensing or indication of either a force or a displacement of solid or fluid matter under investigation.

As will be understood by those skilled in the art, the use of fluid pressure as an operating mechanism for obtaining measurements has wide industrial and scientific application. For measuring relatively high fluid pressures, the most commonly used instruments depend upon the deformation of a closed thin-walled cell of elastic material such as the well-known Bourdon tube. This device is essentially an oval-shaped tube bent into circular or annular form and sealed at one end with the other end being connected to a source of fluid to be measured. With increasing pressure the tube tends to change shape in that the oval cross section tends to become circular and the tube tends to become uncurled. This is resisted by the elasticity of the tube and the closed end partakes of a movement which is proportional to the change in pressure. The end of the tube may be connected to a mechanical system for driving a pointer or to an electrical sensing device which in turn drives a pointer or some other indicating means.

One difficulty with such tubes is that they have a very limited linear characteristic, that is to say, the distance is very small within which the tip will move equal increments for equal changes in pressure. Thus, a single tube is accurate for only a very small range of pressures. Where measurement must be made over a wide range, several instruments must be used, each having a linear response within its own limited range. In many instances it is impossible to remove and replace the instrument under operating conditions, and therefore, valving is used to make the several instruments selectively available. Valving has a distinct disadvantage in that the same is subject to leakage, particularly at high pressures for extended periods of time. Leakage, of course, affects accuracy.

With the above in mind then, the principal object of the invention is to provide a measuring instrument, using, in its preferred form, a thin-walled cell or tube of elastic material to be deformed by fluid pressure but which is useable over a wide range of pressures and which has a linear response throughout the range.

The foregoing is accomplished by virture of my discovery that tubes or cells of the kind in question have a linear force characteristic over a wide range of movement, i.e., the ratio of the potential force of the moving tip to the change of pressure within the tube is a straight line over a wide pressure differential and using this phenomenon as a means to apply stress to an elastic body having a substantially long linear stress-strain characteristic, that is to say, the elastic body partakes of equal strain for equal increments of applied stress. The displacement or strain of the elastic body is used as a means to drive an indicating device which will operate as a function of the load or pressure of the means causing the pressure of the fluid in the cell.

The indicating device may be a pure indicator or may be in the form of a control, for example, a servo control which will respond to initiate some operation as a function of the quantity being measured. While the change in shape or the travel of the cell tip itself may be used to drive the indicating mechanism, it is preferred that the strain of the elastic body be used because it affords a convenient way for obtaining mechanical amplification.

The free movement and the potential force of the tip are both a function of the strain of the cell. By using the force of the tip against an elastic body having linear movement or strain characteristic, the tip movement is no longer free and becomes a function of the strain of the elastic body and hence is linear. Thus, the cell or tube tip may be moved over substantially large distances without being a detriment to the linearity of the instrument. Thus, I am able to use a single cell as an operating mechanism over a very wide pressure range.

The principles of the invention will be understood from the following description and drawings wherein:

FIGURE 1 is an elevational view of a typical instrument incorporating the invention, the view being taken along the line 1—1 of FIGURE 2;

FIGURE 1a is a cross section taken on the line 1a—1a of FIGURE 1;

FIGURE 2 is a plan view of FIGURE 1; and

FIGURE 3 is a diagrammatic view of typical instrumentation for measuring the applied load or stress of a testing machine.

In FIGURE 1 a hollow cell or tube 1 has an oval cross section as indicated in FIGURE 1a and is bent into a circular or annular shape. The tube is made of elastic material, preferably metal. The end or tip 2 of the tube is closed and the end 3 is connected to a manifold 4 fixedly mounted on a bracket 5. The manifold 4 is connected to a hydraulic line 6 by means of the fitting 10. The bracket 5 is fixedly secured to the base 11 of the instrument.

Fluid pressure from the line 6 loads or stresses the tube and causes the same to expand or contract depending upon the pressure value. For example, with increasing pressure, the elliptical shape of the tube tends to become circular and the tube as a whole tends to uncurl or become less arcuate or less circular so that the tip 2 of the tube moves upwardly in a direction generally indicated by the arrow A. When the pressure is decreased and assuming that the elastic limit of the material making up the tube was not exceeded, the tube will revert to its original shape. It will be noted that in either instance the shape of the tube or cell is changed.

Assuming that the tip 2 of the tube is unrestrained the above-mentioned motion will be proportional to the pressure in the tube. Where the motion is very small, the ratio between the pressure in the tube and the movement of the tip will be linear. However, over larger distances the tip motion becomes non-linear. This non-linearity is an inherent defect which limits the usage of the tube.

While the tip motion is non-linear as mentioned above, I have found that the ratio of the potential force of the tip and the pressure in the tube is linear over a wide range of tip movement and pressures. The invention contemplates utilizing this phenomenon as a means for stressing or loading an elastic body having a linear stress-strain characteristic and then employing the strain of the elastic body as a means for driving an indicating device which will indicate or control as a function of the pressure, load or displacement of the machine developing the fluid pressure in the cell. A typical arrangement for accomplishing the foregoing is described below.

The tip 2 of the tube is secured to a coupling 12 which carries a chain 13 having a shackle 14 at its lower end. This shackle carries a knife edge 15 which engages a correspondingly shaped slot 16 in an arm 20. This arm 20 is adapted to apply the force of the tip 2 to an elastic body 21 (FIGURE 2) which has a linear stress-strain characteristic.

The particular linear stress-strain device shown here is preferably of the type disclosed in my Patent 2,729,973. This device includes the elastic body 21 (preferably made of metal) comprising a pair of cubicle ends 22 and 23 both of which are securely fastened to the base 11 and a cubicle center 24 secured to the arm 20. The cubicle center and ends are connected by the elastic portions 25 and 26 both of which are generally cylindrical in cross section and co-axial with one another.

As the tip is moved upwardly, its force will be transmitted to the arm 20, the effect of which is to rotate the arm in a clockwise direction. This movement of the arm 20 will be resisted by the elastic portions 25 and 26. The motion of the arm is substantially about the axes of the portions 25 and 26. Since the motion of the tip 2 of the tube is resisted by a device having a linear stress-strain characteristic, the motion of the tip 2 will also be linear, that is to say, the tip will move equal amounts for equal changes of pressure in the tube 1. The linearity is maintained so long as stress applied to the portions 25 and 26 is within the linear range.

Since the tip motion and/or change in shape of the tube and also the twist of the portions 25 and 26 are each a linear function of the pressure in the tube (hence a true linear function of the cause of the tube pressure), any of these changes can be used as a means for driving an indicator. The present arrangement provides for sensing the strain or twist of the portions 25 and 26 because of certain advantages in sensitivity as explained below.

The arm 20 has an elongated extension 30 and just above the arm is mounted a bracket 31 which is carried by the bracket structure 32 fixedly secured to the cubicle ends 22 and 23. A plurality of control elements 33, preferably differential transformers, are secured to the bracket 31 and the core stems 34 of the transformers are each connected to the extension 30.

As the arm 20 and extension 30 are rotated counter-clockwise with upward motion of the tip 2, it will be seen that each of the core stems 34 of the transformers are also moved. Since the transformers occupy different radial positions with respect to the center of rotation of the arm, i.e., rotation about the axis of the elastic portions 24 and 25, the cores will be moved different amounts. This permits for considerable selectivity and also for mechanical amplification. For example, if the pressure in the tube 1 is small so that the force generated by the tip 2 is a correspondingly small amount, the transformer farthest from the pivot point may be used as the sensing device since this transformer will have the greatest relative motion. As to amplification, it will be seen that where, say the transformer nearest the pivot point is used as the sensing device and it is desired to amplify indication, it is only necessary to switch to one of the outboard transformers.

The instrument may be used in a wide variety of applications either as a force or a displacement indicating device. For example, in FIGURE 3 it will be seen that the instrument may be coupled to a conventional piston and cylinder arrangement 40 or to a conventional capsule device 41. The piston and cylinder device 40 may be the means for loading a specimen in a testing machine, fluid being admitted to the cylinder 42 for moving the piston 43 upwardly. The line 6 of the instrument is coupled directly to the cylinder 42, for example, by the line 44. As the pressure in the cylinder 42 increases, the tube 1 actuates one of the transformers 33 which is connected to drive the load pointer 45 via a servo system indicated at 46. In this instance, of course, the instrument is directly responsive to the actual load being applied to the specimen and since the instrument provides a linear signal, the scale with which the pointer 45 is used may have a linear calibration.

Where the capsule 41 is used, this may be coupled to the line 6 by means of the line 50. The pressure developed in the capsule is transferred directly to the tube 1 which is adapted to drive the pointer 45 as explained just above.

Rather than using the instrument as a means for indicating load, the same may be used for indicating displacement. For example, either the piston and cylinder device 40 or the capsule 41 may be arranged in a machine so that the capsule or the piston is displaced or moved in accordance with certain applied loads. The pressure built up in the capsule or in the cylinder 42 is proportional to the displacement and hence the instrument will sense the pressure and drive an indicating device such as the pointer 45 with the scale associated with the pointer being calibrated in terms of displacement or movement.

While I have shown the tube 1 to be in singular form, it will be apparent that in applications where extremely high pressures are involved, a plurality of tubes may be coupled to a single manifold and each of the free ends joined together through a mechanism which will permit application of the composite force.

I claim:

1. A measuring instrument having a linear response comprising:
   a hollow cell to be stressed by the direct application of fluid pressure internally thereof, the cell having a predetermined shape in the absence of said stress and the stress causing a part of the cell to move and thereby cause said predetermined shape of the cell to change, the moving part exerting a force and being characterized by that the force-stress relationship has a linear portion;
   a body constructed to receive a mechanical stress, the stress causing the body to strain and the body being characterized by that the stress-strain relationship has a linear portion;
   means interconnecting said part and said body to apply the force of the part to the body and stress the same;
   means connected with said body to move in accordance with the strain of the body; and
   mechanism connected with said last means to sense its movement.

2. A measuring instrument having a linear response comprising:
   a hollow element to receive fluid pressure and having a predetermined shape, the pressure causing the element to strain and change said predetermined shape, and with the change in shape a predetermined part of said element partaking of a movement and the part exerting a force and the element being characterized by that the pressure-force relationship of said part has a linear portion;
   an element to receive mechanical stress, the stress causing predetermined sections of the element to strain and cause a part of the element to partake of a movement in accordance with the strain, the element being characterized by that the stress-strain relationship of last said part has a linear portion;
   means interconnecting said first part and said sections to use the force of said part to stress the sections and cause the same to strain; and
   means connected with second said part to sense the movement of the second part.

3. A measuring instrument having a linear response comprising:
   an elongated hollow element having a predetermined arcuate shape taken in a direction along its axis, the element being closed at one end and open at the other, the application of stress by fluid pressure in the interior of the element causing the element to strain and assume a less arcuate shape, the closed end partaking of a movement and exerting a force as a result of the straining and the closed end being characterized by that the stress-force relationship has a linear portion;

means at the open end of said element for fixedly positioning and connecting the same to a source of fluid pressure;

an elongated element having a cylindrically-shaped section adapted to strain with the application of torque thereto, the section being characterized by that the torque-strain relationship has a linear portion;

a connection between said closed end and said section to apply the force of the end to the section, the force being applied as a torque;

means connected with said section to move in accordance with the strain of the section; and mechanism connected with said means to sense its movement.

References Cited in the file of this patent

UNITED STATES PATENTS

| | | |
|---|---|---|
| 9,163 | Bourdon | Aug. 3, 1852 |
| 912,755 | Strube | Feb. 16, 1909 |
| 1,809,898 | Heise | June 16, 1931 |
| 2,409,161 | Sivertsen | Oct. 8, 1946 |
| 2,620,657 | Stovall | Dec. 9, 1952 |
| 2,729,973 | Strimel | Jan. 10, 1956 |
| 2,732,718 | Cornelison | Jan. 31, 1956 |

FOREIGN PATENTS

| | | |
|---|---|---|
| 8,759 | Great Britain | of 1909 |